US012632473B2

(12) United States Patent
Panda et al.

(10) Patent No.: US 12,632,473 B2
(45) Date of Patent: *May 19, 2026

(54) SMART DATA SIGNALS FOR ARTIFICIAL INTELLIGENCE BASED MODELING

(71) Applicant: ExlService Holdings, Inc., New York, NY (US)

(72) Inventors: Lopamudra Panda, Ghaziabad (IN); Sumit Taneja, Ghaziabad (IN); Sumit Agarwal, Noida (IN); Rashmi Ashrafi, Lake Mary, FL (US); Mustafa Karmalawala, Pune (IN); Saurabh Mittal, New Delhi (IN); Subodh Baranwal, Greater Noida (IN); Gregory Tyler Freeman, Dunwoody, GA (US); Shailesh Giri, Gurgaon (IN); Anurag Arora, Gurugram (IN); Ajay Tiwari, Noida (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/906,118

(22) Filed: Oct. 3, 2024

(65) Prior Publication Data

US 2025/0131016 A1    Apr. 24, 2025

Related U.S. Application Data

(63) Continuation of application No. 18/523,876, filed on Nov. 29, 2023, now Pat. No. 12,118,019.

(30) Foreign Application Priority Data

Apr. 10, 2023    (IN) .............................. 202311026580

(51) Int. Cl.
*G06F 16/00*        (2019.01)
*G06F 3/04817*      (2022.01)
(Continued)

(52) U.S. Cl.
CPC ........ *G06F 16/285* (2019.01); *G06F 3/04817* (2013.01); *G06F 16/24573* (2019.01); *G06Q 40/08* (2013.01)

(58) Field of Classification Search
CPC ............. G06F 16/285; G06F 16/24573; G06F 3/04817; G06F 16/30; G06Q 40/08
(Continued)

(56) References Cited

U.S. PATENT DOCUMENTS 11,842,286 B2    12/2023    Manda et al.
12,118,019 B1    10/2024    Panda et al.
(Continued)

*Primary Examiner* — Alexandria Y Bromell
(74) *Attorney, Agent, or Firm* — Perkins Cole LLP

(57) ABSTRACT

A smart data signals platform for artificial intelligence/ machine learning (AI/ML)-based modeling and simulation is structured to pre-process input data by structuring previously unstructured data that relates to a structured data item and linking the structured data to the data item to generate an enriched dataset. The enriched dataset is used to generate a trigger signal by evaluating at least an aspect to the enriched dataset against at least one criterion that corresponds to a loss hypothesis. The trigger signal is used to automatically monitor subsequently received structured data, access corresponding unstructured data and generate an analysis dataset for one or more machine learning models. The one or more machine learning models generate a computer-based prediction based on the analysis dataset. The prediction can include a resource degradation indicator.

20 Claims, 5 Drawing Sheets

(51) Int. Cl.
*G06F 16/2457* (2019.01)
*G06F 16/28* (2019.01)
*G06Q 40/08* (2012.01)

(58) Field of Classification Search
USPC ........................................................ 707/737
See application file for complete search history.

(56) References Cited

U.S. PATENT DOCUMENTS

2020/0410590 A1* 12/2020 Regmi ................. G01N 33/383
                                                       707/707
2022/0253943 A1* 8/2022 Simonovich ............ H04L 67/02
                                                       707/707

* cited by examiner

SMART DATA SIGNALS FOR ARTIFICIAL INTELLIGENCE BASED MODELING

CROSS-REFERENCE TO RELATED APPLICATION(S)

This application is a continuation of U.S. application Ser. No. 18/523,876, filed Nov. 29, 2023, which claims priority to IN application Ser. No. 20/231,1026580, filed Apr. 10, 2023 and entitled "SMART DATA SIGNALS," which are hereby incorporated by reference in their entireties.

TECHNICAL FIELD

The systems, methods, and computer-readable media disclosed herein relate generally to generating, monitoring, and processing smart data signals, such as smart data signals in artificial intelligence/machine learning (AI/ML) systems for AI/ML-based simulation and modeling.

BACKGROUND

AI/ML can be used to identify patterns in input data. However, because of the size of datasets, ML models can suffer performance loss in the form of increased model execution time. Additionally, ML models may not natively be able to process unstructured data that relates to insurance claims, such as policy documents, correspondence, and call logs. Additionally, ML models can suffer from temporal qualify degradation (model drift), as the models are dependent on the quality of data used for training and their accuracy can decrease over time. Particularly in the insurance claims analytics and audit context, events that give rise to particular types of insurance claims can change over time based on various environmental and economic factors.

Figure 1:
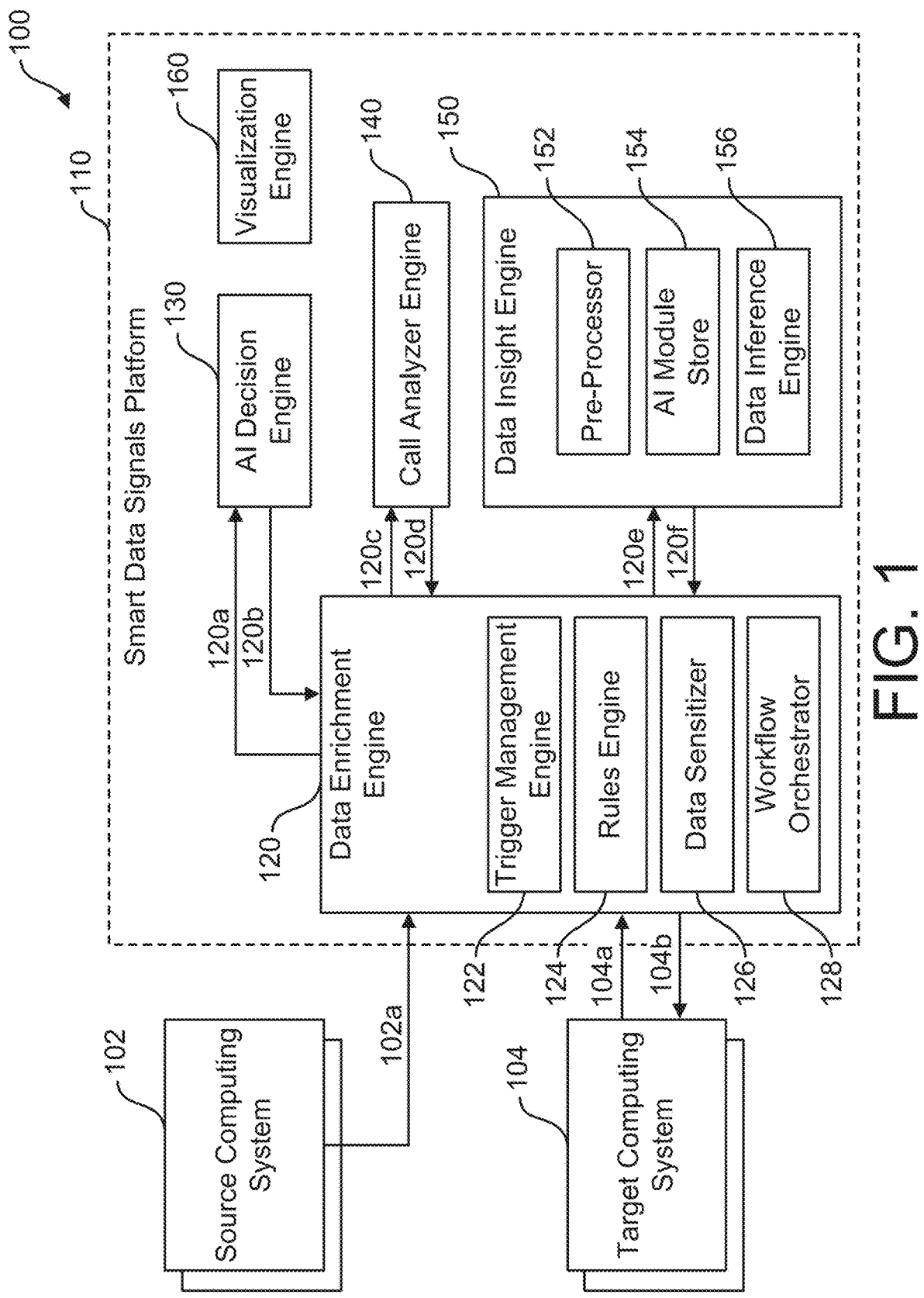
FIG. 1 shows an example computing environment that includes a smart data signals platform in accordance with some implementations of the present technology.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below.

The intention, however, is not to limit the technology to the particular embodiments described. On the contrary, the technology is intended to cover all modifications, equivalents and alternatives falling within the scope of the technology as defined by the appended claims.

DETAILED DESCRIPTION

Disclosed herein are systems, methods, and computer-readable media for generating, monitoring, and processing smart data signals in AI/ML-based simulation and modeling of scenarios, such as claim loss scenarios (hereinafter the "smart data signals platform"). A smart data signals platform ingests various structured and unstructured data. For example, the smart data signals platform can ingest a claim dataset from a claim management computing system and a corresponding call log from a customer relationship management (CRM) computing system. The smart data signals platform can extract or determine items of interest based on the unstructured data-for example, the smart data signals platform can determine a customer sentiment based on the unstructured data from the call log and/or based on a pattern of metadata associated with the unstructured data (e.g., a pattern of relatively frequent policyholder calls). The items of interest can be used to enhance the claim dataset to determine whether an increased likelihood of resource degradation, such as claim revenue leakage and/or customer attrition, exists.

The smart data signals platform enables various technical advantages. For example, the smart data signals platform can generate custom data signals based on input data to enable generation of targeted, reduced, modified or otherwise transformed input datasets for automatic data analytics performed by ML models. The custom data signals can be configured as triggers to enable the generation of input features and targeted, reduced, modified or otherwise transformed datasets suitable for analysis via particular machine learning models, such that the processing load (e.g., processing time, number of nodes in a particular neural network, and so forth) on a particular machine learning model is reduced. For example, it can be resource-intensive to extract and analyze unstructured call transcript data for every claim and/or every customer interaction for a particular claim. Accordingly, the platform can first determine if, for example, a certain pattern of customer interactions (e.g., frequency of calls that exceeds a predetermined threshold, such as once a day, once every three days and so forth) is observed and then, if the pattern matches the criteria of a particular smart data signal, automatically retrieve and analyze the call transcripts. As another example, the platform can extract only those fields from a particular claim that are relevant to a particular analytical task performed by a neural network, thereby reducing the number of nodes and connectors needed to perform the particular analytical task.

Furthermore, the smart data signals platform enables a technical advantage of structuring various unstructured (e.g., textual) data and extracting metadata therefrom to link items in the unstructured data to various structured data items, such as insurance claim identifiers. For example, as part of structuring the data, the platform can parse particular terms or phrases from a customer call transcript to determine a likelihood of revenue leakage or customer attrition. As another example, as part of linking items from unstructured data to items in claims data, the platform can create metadata based on tokens extracted from the unstructured data and bind the metadata to the claims data. The metadata can be used to improve predictive accuracy of machine learning models, to enable reviewers to browse to source data in source systems when reviewing output of machine learning models, and so forth. For example, the platform can enable a reviewer to browse source datasets by using navigation controls generated based on the metadata. The reviewer can also audit the accuracy of automatically generated recommendations, review the accuracy of outputs (such as correlation of loss values to thresholds) of models executed based on specific smart data signals, and so forth. Furthermore, the smart data signals platform can be integrated with input and output platforms (e.g., claims management systems) to facilitate model re-training in response to actions taken by operators in these respective systems.

Example Embodiments of a Smart Data Signals Platform

FIG. 1 shows an example computing environment 100 that includes a smart data signals platform 110 in accordance with some implementations of the present technology. The smart data signals platform 110 is structured to enable automated and continuous monitoring of insurance policy and claim events to detect and prevent resource degradation such as anomalies related to regulatory compliance, revenue leakage and customer complaint propensity. Advantageously, the smart data signals platform 110 can include a data visualization engine 160 that enables operators to review the accuracy of outputs and retrain AI/ML models.

In an example implementation, the smart data signals platform 110 can receive structured input data from a source computing system 102, such as a claims management system. The structured input data can include insurance claim data in tabular form. The elements in the insurance claim data can include, for example, a claim identifier, a policy identifier, an incident description, and so forth. The smart data signals platform 110 can also receive unstructured input data from another one of a source computing system 102. The unstructured input data can include, for example, a call note, a claim note, an email, a policy document, and other data that can include text and/or images. The smart data signals platform 110 can structure the unstructured input data. For example, the smart data signals platform 110 can extract from the unstructured input data various tokens and/or fields (e.g., in a set of one or more tokens and/or fields). The extracted tokens and/or fields can be used to link the structured input data to elements in the unstructured input data. For example, a claim identifier can be extracted from the unstructured input data, such as a call log, an email, and so forth, to link a particular call transcript to an insurance claim based on the extracted claim identifier. As another example, an event identifier or descriptor can be extracted from the unstructured input data, such as a call log, an email, and so forth, to link a particular event described in the unstructured document to a claim. For example, a policyholder can provide incident details (e.g., location, event description, type of incident) in a call, and incident details can be linked to a particular insurance claim.

The smart data signals platform 110 can use the linked data to generate an electronic trigger signal (also referred to as a smart data signal, trigger signal, and/or trigger). The electronic trigger signal can, for example, relate to a particular criterion, such as event type, event timing, policyholder attributes, determined policyholder sentiment, damage type, damage severity, and so forth. In some implementations, the electronic trigger signal can be generated by identifying a particular sequence of events from a combination of records in the input data. The smart data signals platform 110 can extract from the input data a subset that corresponds to a particular signal. The smart data signals platform 110 can execute a trained machine learning model on the subset of extracted data to generate various propensity indicators, such as a claim leakage indicator, a complaint propensity indicator, and so forth. The indicators can be used to present and categorize the input data and generate automatic response recommendations. Operators (users) can be enabled, via a graphical user interface (GUI), to perform various operations on AI/ML-generated recommendations, including browsing the source data and scoring algorithms, entering corrections, labeling and re-labeling data, and so forth. The user input can be used in training the models to improve their predictive accuracy. In some implementations, output data transformations can be generated to include corrected and/or labeled or le-labeled data. For example, output data transformations can include tags containing updated labels, which can facilitate retraining of the model to improve predictive accuracy.

As shown, the environment 100 includes one or more of a source computing system 102, one or more of a target computing system 104, and a smart data signals platform 110. These systems can be communicatively coupled via a network and can each include various components, including one or more processors, memory modules, transceivers, network interfaces, databases, executable files (in binary form and/or in compiled form), libraries of executables, file structures, and so forth. In some implementations, any of the source computing system 102, one or more of a target computing system 104, and smart data signals platform 110 can be distributed across more than one computing devices. For example, a particular smart data signals platform 110 can include an application instance made available to a subscriber entity (e.g., an entity associated with a particular target computing system 104) in a cloud-based environment, such as, for example, in a virtual private cloud, via a virtual network, in a Saas (software-as-a-service computing environment), PaaS (platform-as-a-service computing environment), IaaS (infrastructure-as-a-service computing environment) and/or the like.

As shown, the smart data signals platform 110 includes various engines, some of which can be omitted or combined according to various implementations. The engines in an example implementation can include a data enrichment engine 120, an AI decision engine 130, a call analyzer engine 140, a data insight engine 150, and a visualization engine 160. As used herein, the term "engine" refers to one or more sets of computer-executable instructions, in compiled or executable form, that are stored on non-transitory computer-readable media and can be executed by one or more processors to perform software-and/or hardware-based computer operations. The computer-executable instructions can be special-purpose computer-executable instructions to perform a specific set of operations as defined by parametrized functions, specific configuration settings, special-purpose code, and/or the like. The engines can generate and/or receive various electronic messages (e.g., messages 102*a*, 104*a*, 104*b*, 120*a*, 120*b*, 120*c*, 120*d*, 120*e*, 120*f*). Whenever a particular message is referred to in singular form, one of skill will appreciate that more than one electronic messages can be used to carry out the described operations. For example, a particular dataset, record, or item therein can be broken down into multiple messages. Furthermore, a particular system or module can generate or receive multiple items (e.g., datasets, records, and/or items) in a particular message.

The data enrichment engine 120 can receive electronic messages 102a, which can include claims data, emails, call recordings, call logs, policy data, and so forth. The data enrichment engine 120 can be structured to receive these messages via a suitable method, such as via a user interface (e.g., by providing a GUI in an application available to a subscriber entity that allows a subscriber to enter or upload data), via an application programming interface (API), by using a file transfer protocol (e.g., SFTP), by accessing an upload directory in the file system of a particular source computing system 102, by accessing a storage infrastructure configured to allow a particular source computing system 102 to execute write operations and save items, and the like. In some implementations, the storage infrastructure can include physical items, such as servers, direct-attached storage (DAS) devices, storage area networks (SAN) and the like. The storage infrastructure can be a virtualized storage infrastructure that can include object stores, file stores and the like. The data enrichment engine 120 can include event-driven programming components (e.g., one or more event listeners implemented by the workflow orchestrator 128) that can coordinate the allocation of processing resources at runtime based on the size of the received messages and/or other suitable parameters. The one or more event listeners can be configured to monitor the received messages based on particular smart data signals, which can be deployed, for example, to monitor data from a particular source computing system and/or a particular target computing system.

The data enrichment engine 120 can work in conjunction with the call analyzer engine 140. For example, the data enrichment engine 120 can forward, in an electronic message 120c, a received call recording or call transcript to the call analyzer engine 140. In some implementations, rather than forwarding a call recording, the data enrichment engine 120 can execute operations to intercept a particular voice call in substantially real time and generate a plurality of messages 120c, each containing a particular unit of the intercepted voice call. Based on the messages 120c, the call analyzer engine 140 can perform various operations to generate and return extracted data, indication of caller intent, and other information in tokenized or structured form via one or more of a message 120d. In some implementations, the call analyzer engine 140 can generate a call transcript and extract tokens corresponding to a particular insurance claim (e.g., claim identifier, incident type, incident location, incident description, and so forth). In some implementations, the call analyzer engine 140 can determine and generate an indication of a caller sentiment by analyzing properties of the messages 120c that include voice data, such as tone, volume, specific terms used by the caller, speech patterns, and so forth. In some implementations, the call analyzer engine 140 can execute an AI/ML model on the input messages 120c to perform natural language processing to identify tokens and/or patterns, extractive summarization, and so forth.

The data enrichment engine 120 can work in conjunction with the AI decision engine 130. For example, the data enrichment engine 120 can forward, in one or more of an electronic message 120a, to the AI decision engine 130, any of the items received by the data enrichment engine 120 from a particular source computing system 102.

Prior to transmitting a particular item, such as a file, record, or data point received from the source computing system 102, in messages 120a, the data sensitizer 126 of the data enrichment engine 120 performs data cleansing and pre-processing operations. In some implementations, data cleansing and pre-processing operations can be performed according to the rules executed by the rules engine 124. The rules can be triggered for execution based on various attributes of the received messages 102a, such as incident type, policy identifier, policy type, location, and so forth. The rules can also be triggered for execution based on a particular target computing system identifier-for instance, when the rules are customer-specific. In various implementations, data cleansing and pre-processing operations include performing a data type conversion of a particular input item (e.g. floating-point to fixed to preserve storage space), replacing null values with default values, filling in missing data using regression-based machine learning models, concatenating and/or truncating string values, segmenting long text items into a plurality of strings of predetermined length, and so forth. More generally, data cleansing and pre-processing operations can include various quantization approaches not limited to data type conversion, aimed to reduce the size of input data and improve model efficiency.

Prior to transmitting a particular item in a message 120a, the data sensitizer 126 of the data enrichment engine 120 can perform data validation operations. Data validation operations can be performed according to the rules executed by the rules engine 124. For example, categorical data can be evaluated to assess compliance with data value domains provided by the rules engine 124. For example, validating the data can include updating or generating a particular token to have a value and/or format that conforms to a particular value or format of an item in the data value domain. The rules engine 124 can be populated with entity-specific or domain-specific rules (e.g., based on the client identifier of the source computing system 102, based on incident type, based on coverage type) when a particular new entity associated with a new source computing system 102 is onboarded.

After the AI decision engine 130 receives one or more of the message 120a, the AI decision engine 130 can perform operations to generate a list of items for an electronic message 120b. For example, the AI decision engine 130 parses a particular item or a set of items from the message 120a and apply one or more criteria associated with a particular hypothesis. In some implementations, the hypothesis is provided by the rules engine 124. Generally, a hypothesis includes a set of rules that, when applied to the natively structured data (e.g., claim data) or the tokens extracted by the unstructured data transformed by the data sensitizer 126, produces an outcome within a particular threshold of certainty (such as a p-value, a percentage, and so forth). For example, a combination of a particular detected customer sentiment and a particular incident type or policy type can indicate a particular (e.g., high, medium, low) probability of claim/revenue leakage. As another example, a history of customer calls at a particular frequency (e.g., more than once a day) can indicate a particular complaint propensity. As another example, a pattern in a claim history for a particular policyholder or location can raise a flag for claim review. As yet another example, an occurrence of a particular event in the past (e.g., policyholder complaint) can indicate a relatively high probability of customer departure.

The AI decision engine 130 can execute one or more machine learning models to generate a set of data elements that can meet the criteria for a particular hypothesis. The input messages 120a can include outcome data, such as date of actual customer departure, customer complaint date, nature of customer complaint, subsequent event of relatively higher severity, and so forth. In some implementations, the outcome data is included in training data used to train the machine learning models of the AI decision engine 130. The outcome data can also be supplied by a reviewer via a graphical user interface (GUI) of the visualization engine 160 to help the AI decision engine 130 improve its predictive capacity. The machine learning models of the AI decision engine 130 can perform unsupervised learning by inferring patterns from a sequence of claims corresponding to a particular policyholder, policy, location, and so forth.

After receiving, from the AI decision engine 130 in the message 120b, a set of items, data fields, query criteria, tokens and so forth generated by the AI decision engine 130, the trigger management engine 122 of the data enrichment engine 120 can generate one or more smart data signal triggers that define monitoring and/or segmentation criteria for further data received in subsequent messages 102a from the source computing system(s) 102. In some implementations, the triggers relate to monitored events (e.g., claim type, claim by a particular policyholder, claim for a particular location and so forth). In some implementations, the triggers are time-based (e.g., for claims with event dates or submission dates in a particular range). In some implementations, the triggers are associated with various indicators that correspond to a particular hypothesis (e.g., leakage/revenue loss propensity indicators, complaint propensity indicators). Triggers can take the form of executable files, queries, event listeners, interface engine rules, rules for data parsers, parameters, and so forth, or a combination thereof. Triggers can be deployed (e.g., caused to execute) as operating system executables, database executables, interface engine executables, application executables, and so forth. Triggers can be scheduled to execute continuously or periodically (e.g., every 10 milliseconds, every 100 milliseconds, every second, every minute, every hour, and so forth).

The workflow orchestrator 128 can deploy a particular trigger generated by the trigger management engine 122. For example, the workflow orchestrator 128 can include an alert repository and/or a scheduler and can be configured to evaluate incoming messages 102a against criteria defined by the trigger. Alerts can be configured based on projected impact, severity, risk, and so forth. The projected impact, severity, and/or risk can be in a one-to-one or a one-to-many relationship for a particular trigger such that additional elements parsed from a particular message 102a can drive the projected impact, severity, and/or risk. The projected impact, severity, and/or risk can be in a one-to-one or a one-to-many relationship for a particular claim identifier returned by the data insight engine in the message 120f such that additional elements within a particular message 120f (e.g., an automatically generated score or recommendation) can drive the projected impact, severity, and/or risk. As another example, workflow orchestrator 128 can include a parser configured to identify a timestamp, policy identifier, source system, claim identifier, or another attribute of a message 102a and can be configured to parse particular elements from messages 102a and evaluate them against criteria defined by a trigger. As another example, workflow orchestrator 128 can include a message router that can be activated for a subset of claims in messages 102a that correspond to a particular trigger. For instance, if trigger criteria are met, the message router can be activated. Once activated, the message router can make API calls to obtain supplemental data from additional source systems (e.g., call logs) and route the obtained items to the call analyzer engine 140 by generating a new message 120c in order to obtain supplemental information. In some implementations, once activated, the message router can be configured to function as a filter by discarding certain supplemental data received from additional source systems to preserve computing resources.

The data enrichment engine 120 can work in conjunction with the data insight engine 150. For example, the data enrichment engine 120 can generate an analysis dataset in the form of one or more messages 120e to the data insight engine 150. The analysis dataset can contain one or more items (e.g., a particular message 102a, a set of messages 102a, a particular message 120b, a set of messages 120b, a particular message 120d, a set of messages 120d) that met criteria for a specific trigger activated by the workflow orchestrator 128. The one or more items can include input data (e.g., claims) in a native format from the source system, pre-processed input data, validated input data, or a combination thereof. In some implementations, the one or more items can include a dataset generated by the data enrichment engine 120 by structuring certain unstructured data, linking the unstructured data to claim data, augmenting the linked data with metadata (e.g., timestamps, source system identifiers, source message 102a identifiers), and so forth. In some implementations, the analysis dataset includes a single record. In some implementations, the analysis dataset includes a plurality of records.

The data enrichment engine 120 can forward, in an electronic message 120e, to the data insight engine 150, a claims review pipeline (i.e. the analytics dataset). The data insight engine 150 can execute (e.g., via the data inference engine 156) one or more machine learning models from the model store 154 on the analytics dataset to generate predictions for a claim leakage propensity, complaint propensity and so forth. According to various implementations, predictions can include discrete data (e.g., [1, 2, 3]), categorical data (e.g., "Low", "Medium", "High"), ranges (e.g., 1.5-10), probabilities (e.g., 0-100%), confidence intervals (e.g., <95%), scores (e.g., risk scores, leakage propensity scores, complaint propensity scores) and/or combinations thereof (e.g., composite scores). According to various implementations, the machine learning models can be supervised, semi-supervised or unsupervised, as described further herein. Further, the data insight engine 150 can execute a pre-processor 152 to normalize the data or generate data aggregations. For example, the pre-processor 152 can identify and remove outliers, calculate averages in order to further reduce the number of input records, and so forth.

The data insight engine 150 can generate and forward, in an electronic message 120f, to the data enrichment engine 120, the insights and outcomes associated with particular claims in the analysis dataset. The workflow orchestrator 128 can be structured to distribute all or a part of a particular message 120f to a target system, such as the target computing system 104 in the form of a message 104b. In some implementations, the workflow orchestrator 128 triggers the analytics operations described herein in response to a request received in message 104a from a particular target computing system 104. In some implementations, the smart data signals platform 110 can include the visualization engine 160, which can be integrated, in whole or in part, with a particular target computing system 104 (e.g., as an executable application, browser-based application, applet, plug-in, and so forth). Accordingly, smart data signals can be delivered via a front-end workflow and/or integrated with various client application(s) provided to the target computing system 104.

The visualization engine 160 is structured to generate user-interactive GUIs that display and enable users to interact with data streams comprised of messages 104b. In some implementations, the visualization engine 160 generates a list of tasks populated with items from the messages 104*b*. The items can include, for example, summary-level information, such as a summary of event monitoring actions raised by the triggers, a summary of data signals received in a particular time frame or for a particular event, a summary and completion status of file reviews, a summary by trigger (claim leakage, customer experience) and so forth. The items can enable a user to drill-down to claim information and include detail items, such as claim identifiers, claim details, policy identifiers, and so forth. The items can further enable a user to view the output items generated by the data insight engine 150, such as scores, categories, indicators, recommendations, and so forth. Summary views enable users to view counts of claims or policies and corresponding policies monitored for a specific duration, view trends in respective share/percentage of claims corresponding to particular signals, view counts of claims for each data signal, view lists of policies for each data signal, view data signals and predictions for each policy, view policies not monitored, and so forth. Detail views enable users, for example, to filter items by specific policy number, claim number, claim stage, date of loss, loss description, claim type or line of business, view data signal details, view claims identified by the workflow orchestrator (e.g., based on a trigger) for manual review, override automatically recommended actions, view priorities, due dates, scores, and so forth.

The GUIs can include actionable controls that allow users to review source data (e.g., items from messages 102*a*), algorithms applied, weight details, items used by a particular AI model to generate a recommendation, and so forth. Users are enabled to review and correct recommendations, label or re-label data, verify accuracy of platform-generated metadata and so forth. In some implementations, the visualization engine 160 generates and includes in the detail view hyperlinks to the corresponding items (e.g., call logs, call recording files, claim files, policy files, invoices, payment records) in respective source computing systems 104 to enable the user to browse the additional data. In some implementations, the GUIs include controls that allow users to add notes, transfer items to other users, and/or escalate items to supervisors.

The GUIs can also include actionable controls that allow users to configure various additional aspects of machine learning models, such as the sampling criteria (e.g., to define the number of claim audits that should be done and how they should be distributed relative to the AI model-generated scores) and/or scoring methodology (e.g., to set the relative weight for items in a composite score).

The smart data signals platform 110 can include a configuration data store that allows administrators to configure single sign-on settings, set password requirements, set the number of maximum sessions allowed per device and/or per user, and so forth. In some implementations, the smart data signals platform 110 can include (e.g., as part of the rules engine 124) classification ratings for information assets used by the platform. The classification ratings can be applied to items in messages 102*a* received from various source systems. In some implementations, the classification ratings can be used to configure items made available to a particular user via the visualization engine 160. For example, users can be enabled to view certain policy types, restricted from accessing customer phone call transcripts or other sensitive information, and so forth.

Example Methods of Operation of the Smart Data Signals Platform

Figure 2:
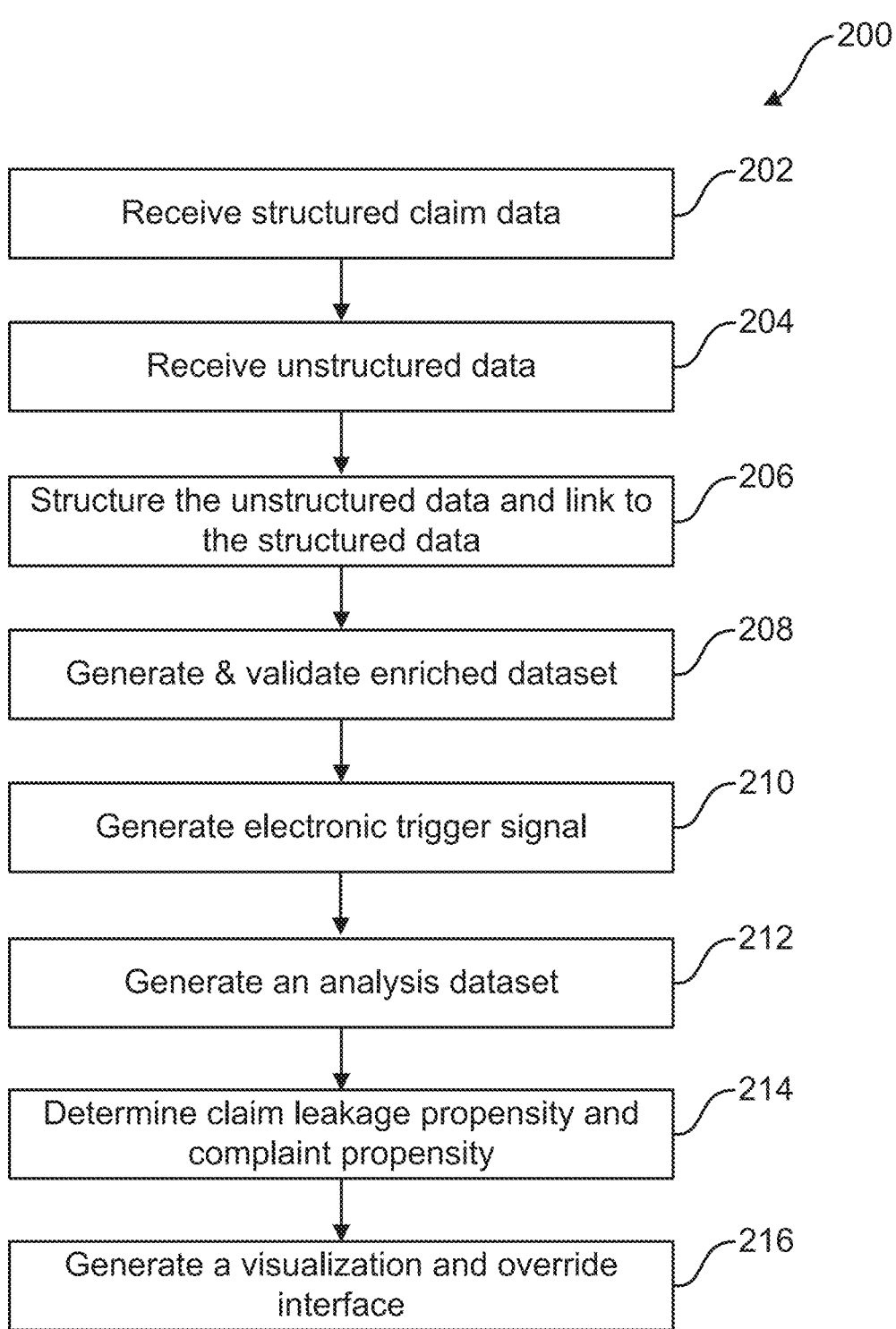
FIG. 2 is a flowchart depicting an example method of operation of the smart data signals platform of FIG. 1, in accordance with some implementations of the present technology.

FIG. 2 is a flowchart depicting an example method 200 of operation of the smart data signals platform 110 of FIG. 1, in accordance with some implementations of the present technology. As a general overview, the method 200 includes receiving structured and unstructured data, structuring the unstructured data and generating a link to the structured data, generating and validating an enriched dataset, using the enriched dataset to generate a smart data trigger signal, using the smart data trigger signal to generate an analysis dataset, and executing one or more machine learning models on the analysis dataset to generate indicators of claim leakage propensity, complaint propensity, risk propensity, recommendations, and so forth. The resulting data can be provided to a visualization engine that enables the user to review the data, navigate to source documents and data, review AI-generated recommendations, and override the recommendations to improve predictive value of the AI model(s).

At operations 202, first structured input data is received from a source computing system. The first structured input data can include claim data. At operations 204, unstructured input data is received. The unstructured data can include a call note, a claim note, an email, and/or a policy document, or a combination thereof. At operations 206, the unstructured data is structured to generate second structured input data. Generating the second structured input data can include scanning an input document to identify a particular form field (e.g., based on field coordinates or an associated label) and extracting a data value from the form the field as a token. Generating the second structured input data can also include performing optical character recognition operations (OCR) on a document (e.g., a PDF document, an image document) or a portion thereof and generating one or more tokens that correspond to units (sentences, words, strings of predetermined length such as a standard record length) in the output of the OCR operations. Generating the second structured input data can also include applying transformation functions to extracted values to generate tokens according to a dictionary (e.g., a domain-specific dictionary). More generally, tokens can be extracted from or generated based on the unstructured data (for example, as described above and/or in U.S. patent application Ser. No. 17/988,684 (U.S. Pat. No. 11,842,286), which is incorporated herein by reference in its entirety and for all purposes) and can include claim identifiers, call information, call sentiment indicators, policy identifiers, coverage descriptions, location identifiers, and so forth. One or more items extracted from the unstructured data can be included in second structured input data, which can be linked to the first structured input data based, for example, on the extracted identifiers.

Furthermore, one or more items extracted from the unstructured data can be included in metadata generated by the platform. For example, the platform can generate one or more metadata items and bind (associate, link) the one or more metadata items to a particular extracted identifier or another unique identifier on which the tokens are linked to the first structured input dataset. One or more tokens in the set of tokens can be linked to the first structured input dataset in the form of metadata. As an example, an unstructured input document can include an identifier (e.g., a document ID, a path, and so forth) associated with a particular source computing system 102 as well as a claim identifier. Both identifiers can be extracted from the unstructured input document in the form of tokens, and a metadata field can be generated and associated with an item in the first structured input dataset. The item in the first structured input dataset can be determined based on the claim identifier extracted from the unstructured dataset. The metadata field can be populated with the extracted identifier of the source computing system 102 extracted from the unstructured dataset.

At operations 208, an enriched dataset is generated and/or validated. Generating and validating an enriched dataset can include various data cleansing and pre-processing operations as described above in reference to FIG. 1. For example, data cleansing and pre-processing operations are performed according to the rules executed by the rules engine 124 of FIG. 1. The rules can be triggered for execution based on various attributes of the enriched dataset, such as incident type, policy identifier, policy type, location, and so forth. For example, if a property damage claim includes a particular combination of attributes, such as date range and location, the rules can cause the platform to automatically access and analyze an additional dataset (e.g., a weather tracking system) to determine whether a natural disaster took place in the locality, whether a level of reported damage is consistent with an expected level of damage, and so forth.

In various implementations, data cleansing and pre-processing operations can also include performing quantization operations, replacing null values with default values, filling in missing data using regression-based machine learning models, concatenating and/or truncating string values, segmenting long text items into a plurality of strings of predetermined length, and so forth. In some implementations, data validation operations can be performed according to the rules executed by the rules engine 124 of FIG. 1. For example, categorical data can be evaluated to assess compliance with data value domains provided by the rules engine 124.

At operations 210, an electronic trigger signal is generated. Generating an electronic trigger signal can include evaluating the enriched dataset against one or more criteria associated with a particular hypothesis. In some implementations, the electronic trigger signal can relate to the progression of a particular claim through a predetermined sequence of events. The sequence of events can include predetermined event types (e.g., incident types, location, policyholder, call pattern, other customer interaction pattern). The events in the sequence of events can be determined to comprise a sequence if the events follow a particular order, if the events are separated by a particular time window (e.g., occur within a predetermined number of hours or days of one another), and/or if particular incident types form an ordered sequence that can be indicative of a relatively higher propensity for leakage, customer loss, or fraud. In some implementations, the electronic trigger signal can relate to a claim attribute, such as a particular value in a claim record. In some implementations, the electronic trigger signal can be based on another electronic trigger signal such that, for example, a particular claim record that meets criteria for a particular trigger signal is included in an analysis dataset for another particular trigger even if criteria for the other particular trigger are not met (such that, for example, a particular claim can be assessed for both revenue leakage and fraud).

At operations 212, the electronic trigger signal is deployed by a workflow orchestrator to monitor further incoming messages from source systems and, when the signal criteria are met, collect one or more incoming messages into an analysis dataset. In some implementations, the operations 204-208 are performed for the one or more incoming messages, and, instead of or in addition to including the one or more incoming messages in the analysis dataset, a new enriched dataset is created based on the one or more incoming messages and the enriched data is included in the analysis dataset. In some implementations, the enriched dataset is augmented with additional data requested (e.g., via an API call) from a secondary computing system, such as an audit system, an email system, a call logger, and so forth. The additional data can be accessed based on at least one of a claim identifier and a claim attribute (e.g. an attribute of a claim other than a claim identifier). Accessing the additional data can include generating and transmitting a data request to the secondary computing system, the data request comprising a claim identifier from the analysis dataset or the claim attribute. In response to receiving the additional data, the platform can structure the additional data (e.g., extract tokens from the data) and/or bind the additional data to the analysis dataset as at least one of an additional data item (e.g., field) or an additional metadata item.

At operations 214, a machine learning model is executed on the analysis dataset. The machine learning model generates insights relating to the analysis dataset. The generated insights can include, for example, predictions for a claim leakage propensity, complaint propensity and so forth. The generated insights can further include an action recommendation, which can be based on the determined claim leakage propensity and/or complaint propensity. The generated insights can include indicators, alerts, and so forth, which can be bound to the analysis dataset to further enrich the analysis dataset.

At operations 216, the analysis dataset that now includes the indicator(s) and/or alert(s) is provided to a visualizer application. The visualizer application can generate dashboards, which can include summary and/or detail views of the analysis dataset and the corresponding indicator(s) and/or alert(s).

Figure 3:
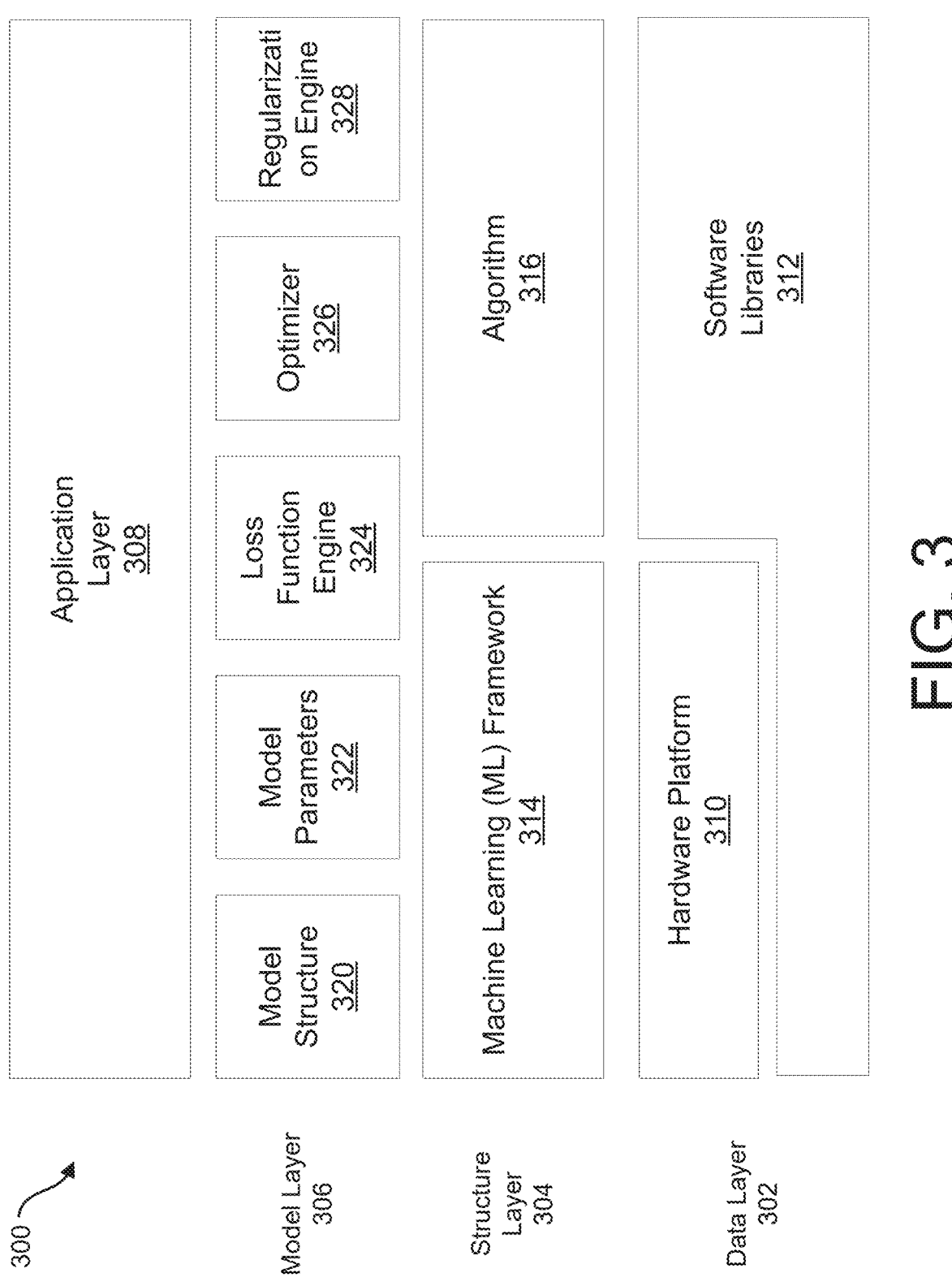
FIG. 3 illustrates a layered architecture of an artificial intelligence (AI) system that can implement the machine learning models of the smart data signals platform of FIG. 1, in accordance with some implementations of the present technology.

Example Embodiment of the AI Decision Engine of the Smart Data Signals Platform FIG. 3 illustrates a layered architecture of an artificial intelligence (AI) system 300 that can implement the machine learning models of the smart data signals platform 110 of FIG. 1, in accordance with some implementations of the present technology. Example machine learning models can include the models executed by the AI decision engine 130, call analyzer engine 140, and/or data insight engine 150. Accordingly, each of the AI decision engine 130, call analyzer engine 140, and/or data insight engine 150 can include one or more components of the AI system 300.

As shown, the AI system 300 can include a set of layers, which conceptually organize elements within an example network topology for the AI system's architecture to implement a particular AI model. Generally, an AI model is a computer-executable program implemented by the AI system 300 that analyses data to make predictions. Information can pass through each layer of the AI system 300 to generate outputs for the AI model. The layers can include a data layer 302, a structure layer 304, a model layer 306, and an application layer 308. The algorithm 316 of the structure layer 304 and the model structure 320 and model parameters 322 of the model layer 306 together form an example AI model. The optimizer 326, loss function engine 324, and regularization engine 328 work to refine and optimize the AI model, and the data layer 302 provides resources and support for application of the AI model by the application layer 308.

The data layer 302 acts as the foundation of the AI system 300 by preparing data for the AI model. As shown, the data layer 302 can include two sub-layers: a hardware platform 310 and one or more software libraries 312. The hardware platform 310 can be designed to perform operations for the AI model and include computing resources for storage, memory, logic and networking, such as the resources described in relation to FIGS. 4 and 5. The hardware platform 310 can process amounts of data using one or more servers. The servers can perform backend operations such as matrix calculations, parallel calculations, machine learning (ML) training, and the like. Examples of servers used by the hardware platform 310 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 310 can include computing resources, (e.g., servers, memory, etc.) offered by a cloud services provider. The hardware platform 310 can also include computer memory for storing data about the AI model, application of the AI model, and training data for the AI model. The computer memory can be a form of random-access memory (RAM), such as dynamic RAM, static RAM, and non-volatile RAM.

The software libraries 312 can be thought of suites of data and programming code, including executables, used to control the computing resources of the hardware platform 310. The programming code can include low-level primitives (e.g., fundamental language elements) that form the foundation of one or more low-level programming languages, such that servers of the hardware platform 310 can use the low-level primitives to carry out specific operations. The low-level programming languages do not require much, if any, abstraction from a computing resource's instruction set architecture, allowing them to run quickly with a small memory footprint. Examples of software libraries 312 that can be included in the AI system 300 include Intel Math Kernel Library, Nvidia cuDNN, Eigen, and Open BLAS.

The structure layer 304 can include an ML framework 314 and an algorithm 316. The ML framework 314 can be thought of as an interface, library, or tool that allows users to build and deploy the AI model. The ML framework 314 can include an open-source library, an application programming interface (API), a gradient-boosting library, an ensemble method, and/or a deep learning toolkit that work with the layers of the AI system facilitate development of the AI model. For example, the ML framework 314 can distribute processes for application or training of the AI model across multiple resources in the hardware platform 310. The ML framework 314 can also include a set of pre-built components that have the functionality to implement and train the AI model and allow users to use pre-built functions and classes to construct and train the AI model. Thus, the ML framework 314 can be used to facilitate data engineering, development, hyperparameter tuning, testing, and training for the AI model. Examples of ML frameworks 314 that can be used in the AI system 300 include TensorFlow, PyTorch, Scikit-Learn, Keras, Cafffe, LightGBM, Random Forest, and Amazon Web Services.

The algorithm 316 can be an organized set of computer-executable operations used to generate output data from a set of input data and can be described using pseudocode. The algorithm 316 can include complex code that allows the computing resources to learn from new input data and create new/modified outputs based on what was learned. In some implementations, the algorithm 316 can build the AI model through being trained while running computing resources of the hardware platform 310. This training allows the algorithm 316 to make predictions or decisions without being explicitly programmed to do so. Once trained, the algorithm 316 can run at the computing resources as part of the AI model to make predictions or decisions, improve computing resource performance, or perform tasks. The algorithm 316 can be trained using supervised learning, unsupervised learning, semi-supervised learning, and/or reinforcement learning.

Using supervised learning, the algorithm 316 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of messages 102*a*) from various source computing systems described in relation to FIG. 1. Furthermore, training data can include pre-processed data generated (e.g., in the form of messages 120*b*, 120*d*, 120*f*) by various engines of the smart data signals platform 110 described in relation to FIG. 1. The user may label the training data based on one or more classes and trains the AI model by inputting the training data to the algorithm 316. The algorithm determines how to label the new data based on the labeled training data. The user can facilitate collection, labeling, and/or input via the ML framework 314. In some instances, the user may convert the training data to a set of feature vectors for input to the algorithm 316. Once trained, the user can test the algorithm 316 on new data to determine if the algorithm 316 is predicting accurate labels for the new data. For example, the user can use cross-validation methods to test the accuracy of the algorithm 316 and retrain the algorithm 316 on new training data if the results of the cross-validation are below an accuracy threshold.

Supervised learning can involve classification and/or regression. Classification techniques involve teaching the algorithm 316 to identify a category of new observations based on training data and are used when input data for the algorithm 316 is discrete. Said differently, when learning through classification techniques, the algorithm 316 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 316 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 316 is continuous. Regression techniques can be used to train the algorithm 316 to predict or forecast relationships between variables. To train the algorithm 316 using regression techniques, a user can select a regression method for estimating the parameters of the model. The user collects and labels training data that is input to the algorithm 316 such that the algorithm 316 is trained to understand the relationship between data features and the dependent variable(s). Once trained, the algorithm 316 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 316 learns patterns from unlabeled training data. In particular, the algorithm 316 is trained to learn hidden patterns and insights of input data, which can be used for data exploration or for generating new data. Here, the algorithm 316 does not have a predefined output, unlike the labels output when the algorithm 316 is trained using supervised learning. Said another way, unsupervised learning is used to train the algorithm 316 to find an underlying structure of a set of data, group the data according to similarities, and represent that set of data in a compressed format. The smart data signals platform can use unsupervised learning to identify patterns in claim history (e.g., to identify particular event sequences) and so forth. In some implementations, performance of the data inference engine 156 that can use unsupervised learning is improved because the incoming data message 120e is pre-processed and reduced, based on the relevant triggers, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 316 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 316 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 316 include factor analysis, item response theory, latent profile analysis, and latent class analysis.

The model layer 306 implements the AI model using data from the data layer and the algorithm 316 and ML framework 314 from the structure layer 304, thus enabling decision-making capabilities of the AI system 300. The model layer 306 includes a model structure 320, model parameters 322, a loss function engine 324, an optimizer 326, and a regularization engine 328.

The model structure 320 describes the architecture of the AI model of the AI system 300. The model structure 320 defines the complexity of the pattern/relationship that the AI model expresses. Examples of structures that can be used as the model structure 320 include decision trees, support vector machines, regression analyses, Bayesian networks, Gaussian processes, genetic algorithms, and artificial neural networks (or, simply, neural networks). The model structure 320 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 320 may include one or more hidden layers of nodes between the input and output layers. The model structure 320 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 322 represent the relationships learned during training and can be used to make predictions and decisions based on input data. The model parameters 322 can weight and bias the nodes and connections of the model structure 320. For instance, when the model structure 320 is a neural network, the model parameters 322 can weight and bias the nodes in each layer of the neural networks, such that the weights determine the strength of the nodes and the biases determine the thresholds for the activation functions of each node. The model parameters 322, in conjunction with the activation functions of the nodes, determine how input data is transformed into desired outputs. The model parameters 322 can be determined and/or altered during training of the algorithm 316.

The loss function engine 324 can determine a loss function, which is a metric used to evaluate the AI model's performance during training. For instance, the loss function engine 324 can measure the difference between a predicted output of the AI model and the actual output of the AI model and is used to guide optimization of the AI model during training to minimize the loss function. The loss function may be presented via the ML framework 314, such that a user can determine whether to retrain or otherwise alter the algorithm 316 if the loss function is over a threshold. In some instances, the algorithm 316 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 326 adjusts the model parameters 322 to minimize the loss function during training of the algorithm 316. In other words, the optimizer 326 uses the loss function generated by the loss function engine 324 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 326 used may be determined based on the type of model structure 320 and the size of data and the computing resources available in the data layer 302.

The regularization executes regularization operations. Regularization is a technique that prevents over-and under-fitting of the AI model. Overfitting occurs when the algorithm 316 is overly complex and too adapted to the training data, which can result in poor performance of the AI model.

Underfitting occurs when the algorithm 316 is unable to recognize even basic patterns from the training data such that it cannot perform well on training data or on validation data. The optimizer 326 can apply one or more regularization techniques to fit the algorithm 316 to the training data properly, which helps constraint the resulting AI model and improves its ability for generalized application. Examples of regularization techniques include lasso (L1) regularization, ridge (L2) regularization, and elastic (L1 and L2 regularization).

The application layer 308 describes how the AI system 300 is used to solve problem or perform tasks. In an example implementation, the application layer 308 can include the visualization engine 160 of the smart data signals platform.

Example Computing Environment of the Smart Data Signals Platform

Figure 4:
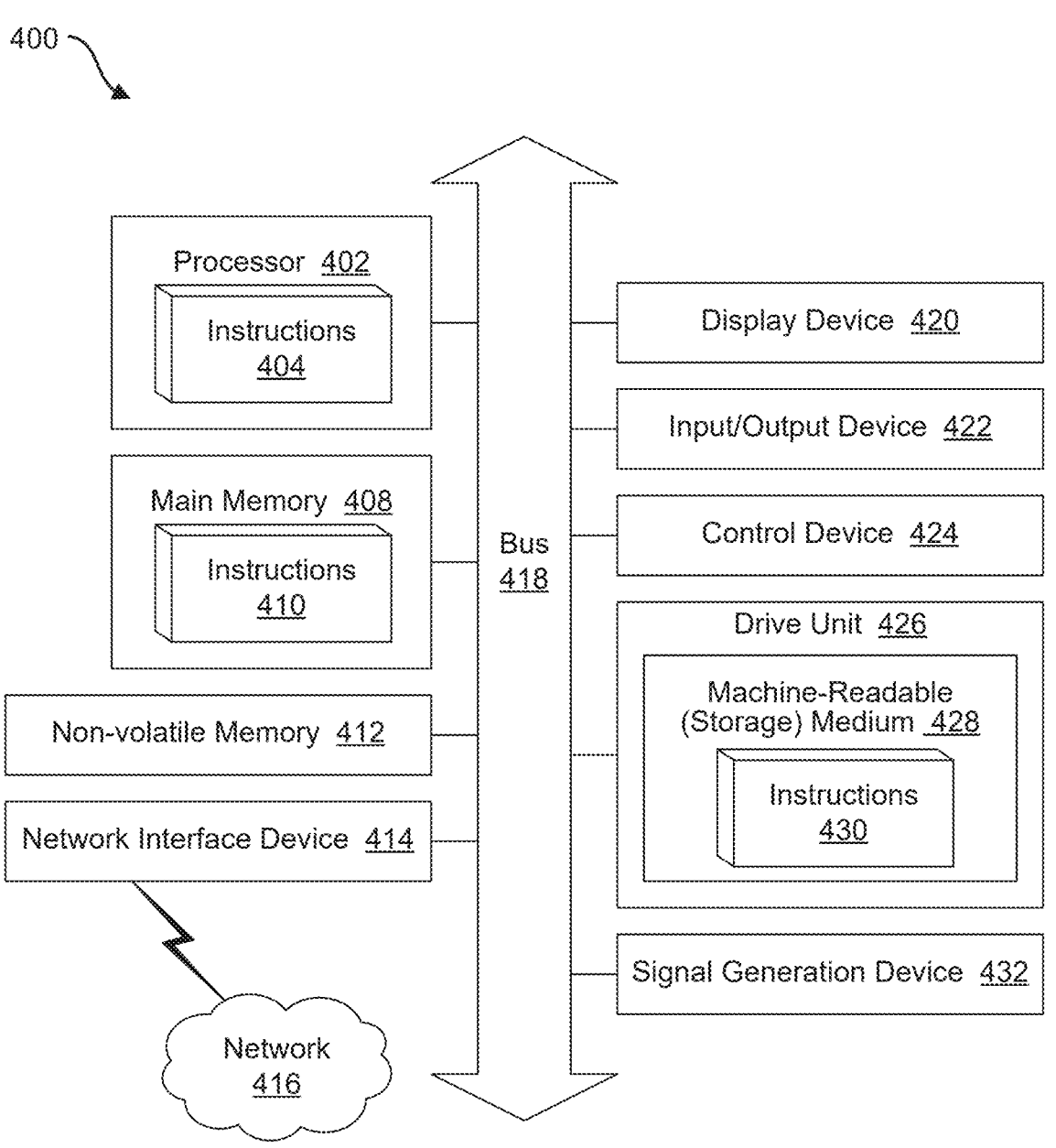
FIG. 4 is a block diagram showing some of the components typically incorporated in at least some of the computer systems and other devices on which the smart data signals platform operates in accordance with some implementations of the present technology.

FIG. 4 is a block diagram showing some of the components typically incorporated in at least some of the computer systems and other devices 400 on which the disclosed system operates in accordance with some implementations of the present technology. As shown, an example computer system 400 can include: one or more processors 402, main memory 408, non-volatile memory 410, a network interface device 414, video display device 420, an input/output device 422, a control device 424 (e.g., keyboard and pointing device), a drive unit 426 that includes a machine-readable medium 428, and a signal generation device 432 that are communicatively connected to a bus 418. The bus 418 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 414 enables the computer system 400 to exchange data in a network 416 with an entity that is external to the computing system 400 through any communication protocol supported by the computer system 400 and the external entity. Examples of the network interface device 414 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 408, non-volatile memory 412, machine-readable medium 428) can be local, remote, or distributed. Although shown as a single medium, the machine-readable medium 428 can include multiple media (e.g., a centralized/distributed database and/or associated caches and servers) that store one or more sets of instructions 430. The machine-readable (storage) medium 428 can include any medium that is capable of storing, encoding, or carrying a set of instructions for execution by the computer system 400. The machine-readable medium 428 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 410, 430) set at various times in various memory and storage devices in computing device(s). When read and executed by the processor 402, the instruction(s) cause the computer system 400 to perform operations to execute elements involving the various aspects of the disclosure.

Figure 5:
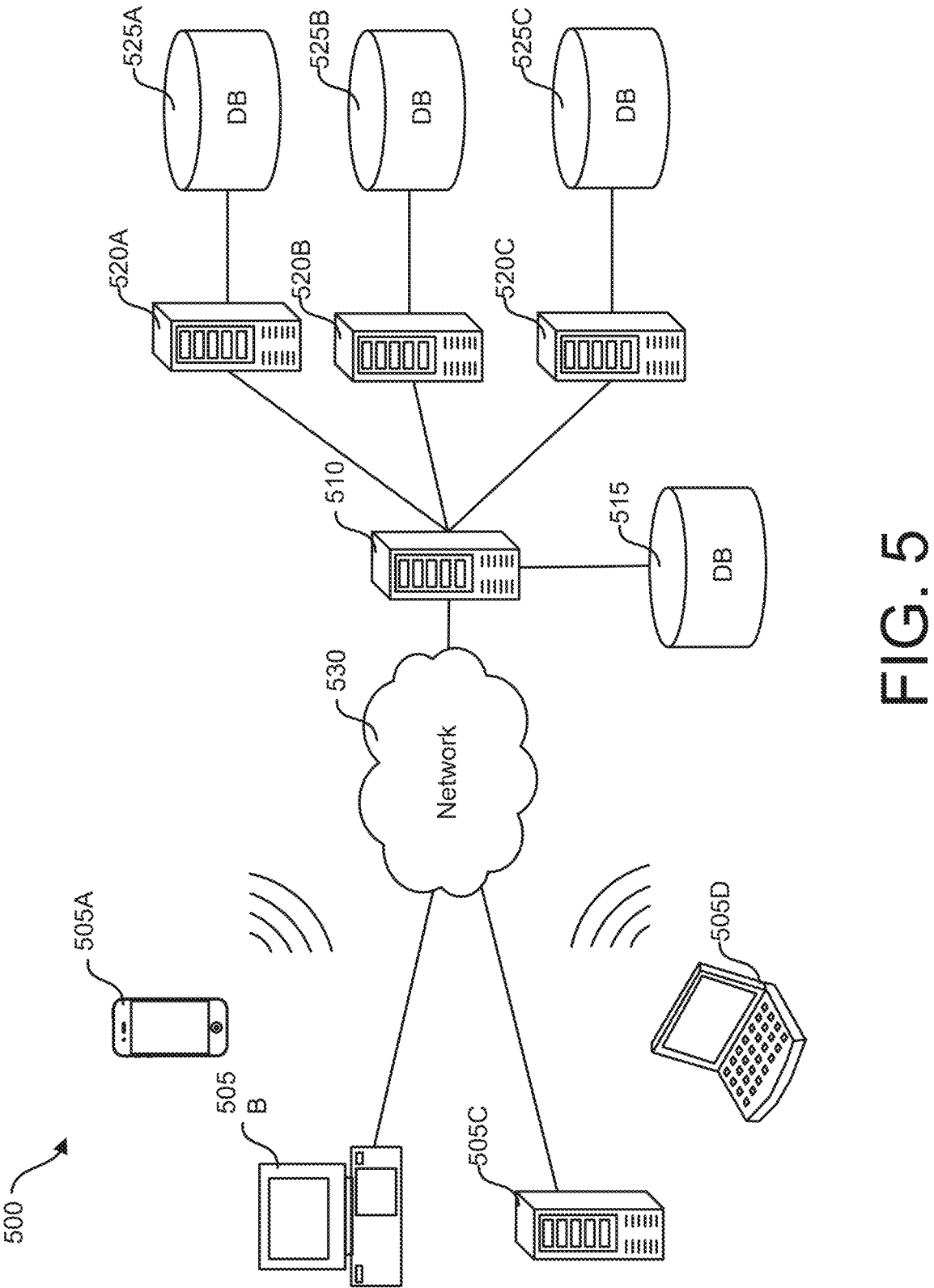
FIG. 5 is a system diagram illustrating an example of a computing environment in which the smart data signals platform operates in some implementations of the present technology.

FIG. 5 is a system diagram illustrating an example of a computing environment in which the disclosed system operates in some implementations. In some implementations, environment 500 includes one or more client computing devices 505A-D, examples of which can host the smart data signals platform 110 of FIG. 1. Client computing devices 505 operate in a networked environment using logical connections through network 530 to one or more remote computers, such as a server computing device.

In some implementations, server 510 is an edge server which receives client requests and coordinates fulfillment of those requests through other servers, such as servers 520A-C. In some implementations, server computing devices 510 and 520 comprise computing systems, such as the smart data signals platform 110 of FIG. 1. Though each server computing device 510 and 520 is displayed logically as a single server, server computing devices can each be a distributed computing environment encompassing multiple computing devices located at the same or at geographically disparate physical locations. In some implementations, each server 520 corresponds to a group of servers.

Client computing devices 505 and server computing devices 510 and 520 can each act as a server or client to other server or client devices. In some implementations, servers (510, 520A-C) connect to a corresponding database (515, 525A-C). As discussed above, each server 520 can correspond to a group of servers, and each of these servers can share a database or can have its own database. Databases 515 and 525 warehouse (e.g., store) information such as claims data, email data, call transcripts, call logs, policy data and so on. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. In some implementations, network 530 is the Internet or some other public or private network. Client computing devices 505 are connected to network 530 through a network interface, such as by wired or wireless communication. While the connections between server 510 and servers 520 are shown as separate connections, these connections can be any kind of local, wide area, wired, or wireless network, including network 530 or a separate public or private network.

Example Use Cases of the Smart Data Signals Platform

Various use cases for the smart data signals platform, such as scenario modeling relating to insurance claims processing, are described above. For example, claim revenue leakage indicators can be generated based on various items in primary data (claims) received from a first source computing system 102 of FIG. 1 and secondary data (call logs, audit logs, customer service system records and so forth) received from one or more of a second source computing system 102. For example, the smart data signals platform can be used to reduce inefficiencies and reduce a number of reopened claims by obtaining claims data, obtaining associated policy descriptions, determining that claims for particular accident types are likely to be inaccurately adjudicated, and generating a smart data signal directing the platform to retrieve certain applicable sections of policy coverage documents and automatically compare policyholder incident descriptions (e.g., from call transcripts) to language in the applicable sections of policy coverage documents. As another example, the smart data signals platform can be used for repair payment analytics to determine whether payments for repairs captured in claims datasets are consistent with terms of supplier contracts determined by automatically structuring and data from unstructured supplier contract documents.

As yet another example, the smart data signals platform can be used to generate claim audit triggers, which can assist in identifying and preventing fraud, inefficiencies in claim processing, and other factors that can contribute to resource degradation and/or claim revenue leakage. In an example audit use case, a smart data signal can direct the platform to generate analytics datasets for audits based on certain criteria of audit eligibility. The criteria can include claim attribute-based criteria, such as in-scope claim types (e.g., automotive, physical damage). The criteria can further include synthetic (system-generated and/or composite) criteria, such as determining the context for a particular reported incident (e.g., whether a severe weather event occurred) and comparing a claim attribute (e.g., damage) to an expected value or descriptor associated with the determined context (e.g., expected type and severity of damage). The criteria can be system-defined and/or user-defined (e.g., supplied by a user through a GUI). The criteria can specify routing rules for particular analytics datasets, such as manual review or automatic review.

As yet another example, the smart data signals platform can be used to implement customer-specific rules. For example, a particular target application 104 can be associated with a particular customer. The customer can have a particular domain dictionary (e.g., standardized terminology), and the smart data signals platform can execute rules to pre-process the data to perform conversions between customer-specific terms and generally accepted terms. These approaches increase portability and reduce the amount of training for certain machine learning models such that pre-trained models can be deployed to a particular instance of the smart data signals platform when additional target computing systems 104 are onboarded.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computer-implemented method executed by a smart data signals platform for artificial intelligence/machine learning (AI/ML)-based simulation and modeling, the method comprising executing, by at least one processor of a computing system having at least one memory, operations comprising:

receiving, by a data enrichment engine, first structured input data;

receiving, by the data enrichment engine, unstructured input data;

structuring the unstructured input data to generate second structured input data, wherein the second structured input data comprises a set of tokens that relate to the unstructured input data;

linking, by the data enrichment engine, the first structured input data and the second structured input data to generate an enriched dataset comprising a set of metadata, wherein at least one item in the set of metadata relates to at least one token in the set of tokens;

performing, by a trigger engine, operations comprising:

generating and storing in the at least one memory an electronic trigger signal definition; and deploying the electronic trigger signal definition in connection with a target computing system by generating and storing in the at least one memory an electronic trigger signal executable;

performing, by a trained artificial intelligence (AI) decision engine, operations comprising:

using the electronic trigger signal executable, generating an analysis dataset;

executing a trained machine learning model on the analysis dataset to generate a resource degradation indicator;

binding the resource degradation indicator to the analysis dataset; and providing the analysis dataset to the target computing system.

2. The method of claim 1, wherein the electronic trigger signal definition relates to one or more of claim progression through a sequence of events, a pattern in the sequence of events, a claim attribute, or a previously generated signal.

3. The method of claim 1, wherein the unstructured input data comprises one or more of an image or text.

4. The method of claim 1, wherein the at least one token in the set of tokens is generated based on the unstructured input data.

5. The method of claim 1, further comprising generating a graphical user interface (GUI) structured to display at least one of a visualization or an alert generated using the analysis dataset.

6. The method of claim 5, wherein the GUI comprises a control structured to enable an operator to escalate a particular item based on the resource degradation indicator.

7. The method of claim 5, wherein the GUI comprises a control structured to display a first set of monitored claims and a second set of unmonitored claims from the first structured input data, the first set and the second set being determined using the electronic trigger signal executable.

8. The method of claim 7, wherein the GUI comprises a control structured to enable an operator to drill down to a claim attribute, the claim attribute being at least one of a policy identifier, a claim identifier, a line of business, a priority, a due date, and a file review score.

9. The method of claim 7, wherein the GUI comprises a control structured to enable an operator to drill down to an electronically generated recommended action.

10. The method of claim 9, wherein the GUI comprises a control structured to enable an operator to override the electronically generated recommended action, and wherein an override is provided to the trained AI decision engine for model training.

11. The method of claim 10, wherein the GUI comprises a control structured to enable an operator to browse the first structured input data and the unstructured input data used to generate a recommended action, the method comprising:

generating, based on the at least one item in the set of metadata, a hyperlink to a resource provided by a computing system to enable the operator to browse the unstructured input data.

12. One or more non-transitory, computer-readable media, excluding transitory signals and carrier waves, the one or more non-transitory, computer-readable media having instructions stored thereon, the instructions, when executed by a processor of a smart data signals platform for artificial intelligence/machine learning (AI/ML)-based simulation and modeling, structured to cause the processor to perform operations comprising:

accessing first structured input data and unstructured input data;

structuring the unstructured input data to generate second structured input data, wherein the second structured input data comprises a set of tokens that relate to the unstructured input data;

linking the first structured input data and the second structured input data to generate an enriched dataset comprising a set of metadata, wherein at least one item in the set of metadata relates to at least one token in the set of tokens;

performing operations comprising:

generating and storing in at least one memory an electronic trigger signal definition; and deploying the electronic trigger signal definition in connection with a target computing system by generating and storing in the at least one memory an electronic trigger signal executable;

performing operations comprising:

using the electronic trigger signal, generating an analysis dataset;

executing a trained machine learning model on the analysis dataset to generate a resource degradation indicator;

binding the resource degradation indicator to the analysis dataset; and providing the analysis dataset to the target computing system.

13. The media of claim 12, wherein generating an analysis dataset comprises:

generating, using the electronic trigger signal executable, the analysis dataset based on a subset of the enriched dataset; and enriching the analysis dataset with additional data associated with a secondary computing system, the secondary computing system being at least one of an audit system, and email system, and a call logger system.

14. The media of claim 13, wherein the additional data comprises an indication of caller sentiment.

15. The media of claim 14, wherein the electronic trigger signal definition relates to a claim audit eligibility indicator, and wherein the claim audit eligibility indicator is determined according to a criterion associated with the target computing system.

16. A computing system comprising at least one processor, at least one memory, and one or more non-transitory, computer-readable media, excluding transitory signals and carrier waves, the media having instructions stored thereon, the instructions, when executed by the at least one processor, causing a smart data signals platform to perform operations for artificial intelligence/machine learning (AI/ML)-based simulation and modeling, the operations comprising:

receive, by a data enrichment engine, first structured input data;

receive, by the data enrichment engine, unstructured input data;

structure the unstructured input data to generate second structured input data, wherein the second structured input data comprises a set of tokens that relate to the unstructured input data;

link, by the data enrichment engine, the first structured input data and the second structured input data to generate an enriched dataset comprising a set of metadata, wherein at least one item in the set of metadata relates to at least one token in the set of tokens;

perform, by a trigger engine, operations comprising:

generating and storing in the at least one memory an electronic trigger signal definition; and deploying the electronic trigger signal definition in connection with a target computing system by generating and storing in the at least one memory an electronic trigger signal executable;

perform, by a trained artificial intelligence (AI) decision engine, operations comprising:

using the electronic trigger signal executable, generating an analysis dataset;

executing a trained machine learning model on the analysis dataset to generate a resource degradation indicator;

bind the resource degradation indicator to the analysis dataset; and provide the analysis dataset to the target computing system.

17. The system of claim 16, wherein structuring the unstructured input data to generate second structured input data comprises:

identifying a field in the unstructured input data;

extracting from the field at least one item; and generating the set of tokens using the at least one item.

18. The system of claim 17, further comprising validating the enriched dataset based on a rule that relates to a particular target computing system or a set of target computing systems, wherein the rule comprises an indication of a data value domain specific to the particular target computing system or the set of target computing systems.

19. The system of claim 18, wherein the data value domain relates to at least one of an incident type and a coverage type.

20. The system of claim 18, further comprising validating the enriched dataset by updating or generating a token in the set of tokens to conform to a particular value or format in a data value domain.

* * * * *